INVENTOR
ERIC H. HECKETT

BY *Francis J. Klempay*
ATTORNEY

March 19, 1963     E. H. HECKETT     3,081,955
ROTATABLE DOUBLE SCREENED CLASSIFIER FOR RECOVERING
REUSABLE METALLICS FROM STEEL MAKING
SLAG AND REFUSE Original Filed June 7, 1956     2 Sheets-Sheet 2

INVENTOR
ERIC H. HECKETT
BY *Francis J. Klempay*
ATTORNEY

United States Patent Office 3,081,955
Patented Mar. 19, 1963

3,081,955
ROTATABLE DOUBLE SCREENED CLASSIFIER FOR RECOVERING REUSABLE METALLICS FROM STEEL MAKING SLAG AND REFUSE
Eric H. Heckett, Valencia, Pa., assignor to Harsco Corporation, Harrisburg, Pa., a corporation of Delaware
Original application June 7, 1956, Ser. No. 590,071. Divided and this application June 27, 1960, Ser. No. 38,876
2 Claims. (Cl. 241—79)

The present application is a division of my co-pending application Serial No. 590,071, filed June 7, 1956, which is now abandoned.

The present invention relates generally to the art of reclaiming metal bearing material from waste materials and more particularly to the provision of improved apparatus for recovering the reusable smaller metallics from steel making slag and refuse. In my U.S. Patent No. 2,837,289 there is shown and disclosed a perforate continuous flow tumbler barrel which is adapted to violently tumble and churn the slag and refuse therein. The encrusting material is cleaned from at least the larger metallics while the smaller metallics and the crushed encrusting material fall through the apertures in the sides of the tumbler barrel. The material falling through the apertures in the sides of the tumbler barrel usually has a high enough percentage of resusable smaller metallics to warrant further recovery operations. However, any such operations must be very efficient and must process large tonnages if the same are to be economically feasible.

It is the primary or ultimate object of this invention to provide apparatus for the efficient processing of large tonnages of the smaller fines and crushed encrusting material to recover the reusable smaller metallics. The disclosed apparatus is adapted to withstand continuous and sustained operation and is characterized by its extreme simplicity in construction and operation.

Another object of this invention is to provide a rotatable double screened classifier for recovering resusable metallics from steel making slag and refuse which is operative to simultaneously further tumble and separate into a plurality of distinct size classifications the encrusting or waste material and the smaller metallics. The further tumbling of the smaller metallics along with the size separation thereof insures that the smaller metallics will be properly and completely cleaned. The discharges emitted by the rotatable double screened classifier—comprising two distinct size classifications of smaller metallics and crushed encrusting or waste material in the disclosed embodiment of the invention—are passed over separate magnetic separator means to reclaim and separate the reusable smaller metallics from the waste material.

The above, as well as other objects and advantages of the invention, will become readily apparent upon consideration of the following specification and accompanying drawing wherein there is disclosed a preferred embodiment constructed and operated in accordance with the teachings of this invention.

Figure 1:
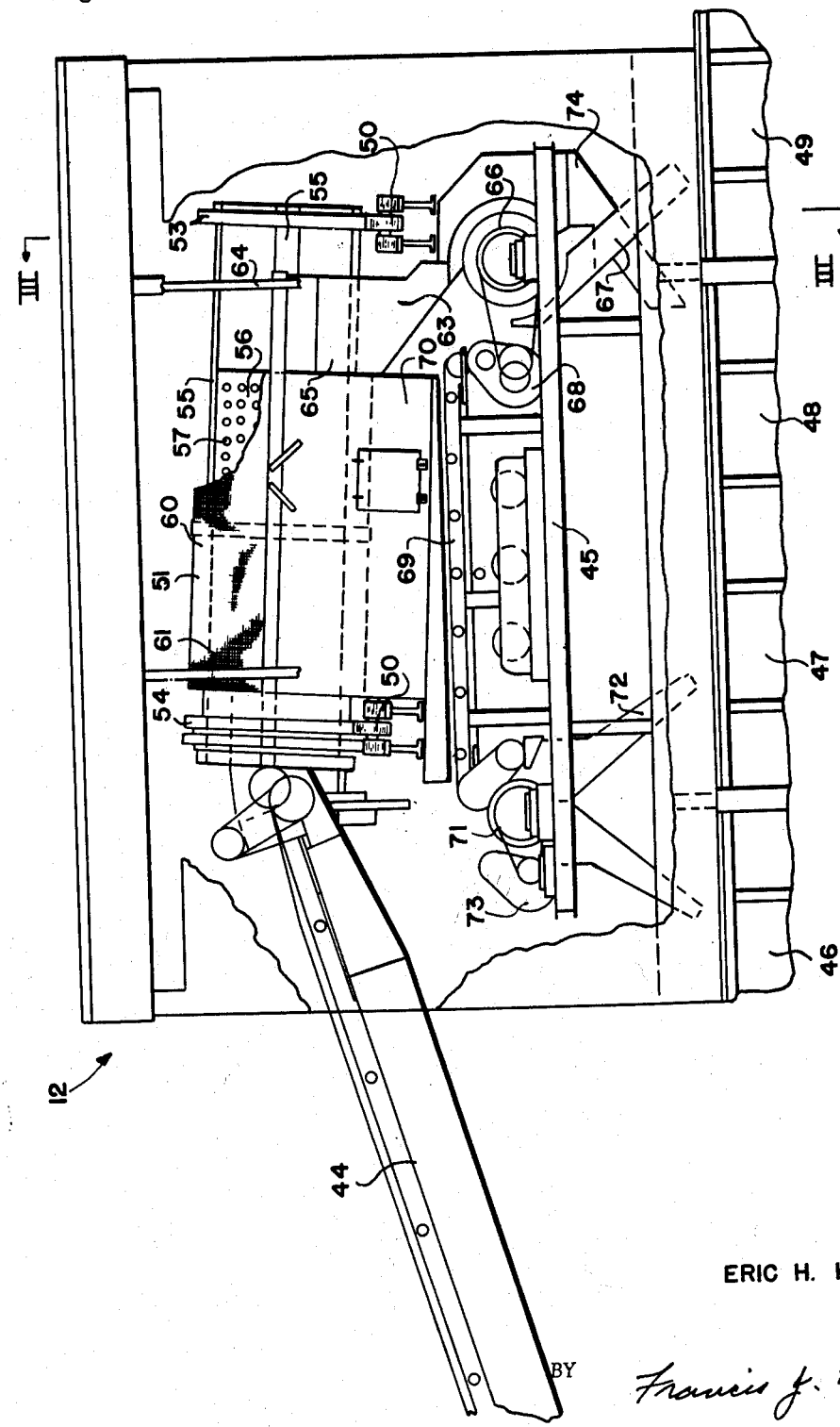
FIGURE 1 is a side elevation of an improved continuous flow rotatable double screened classifier and cleaner constructed in accordance with the principles of my invention.
Figure 2:
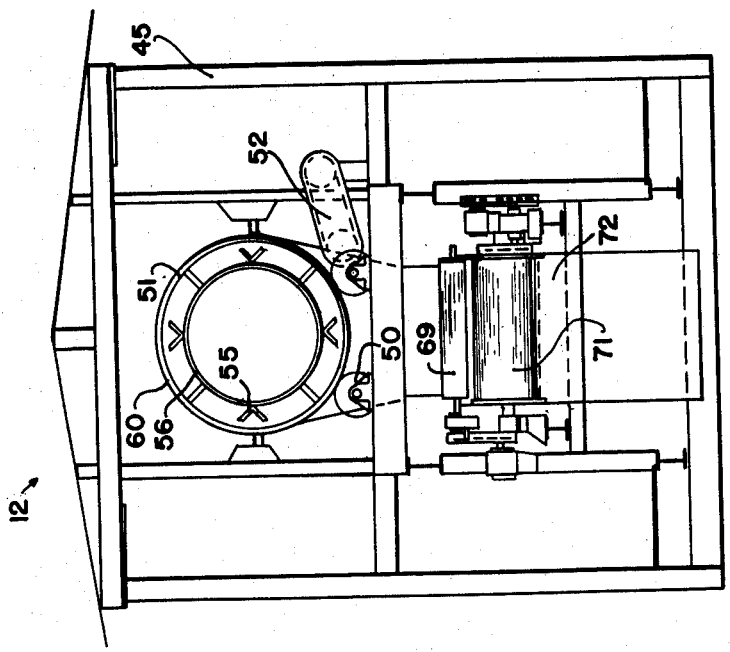
FIGURE 2 is an end view of the apparatus of FIGURE 1.
Figure 3:
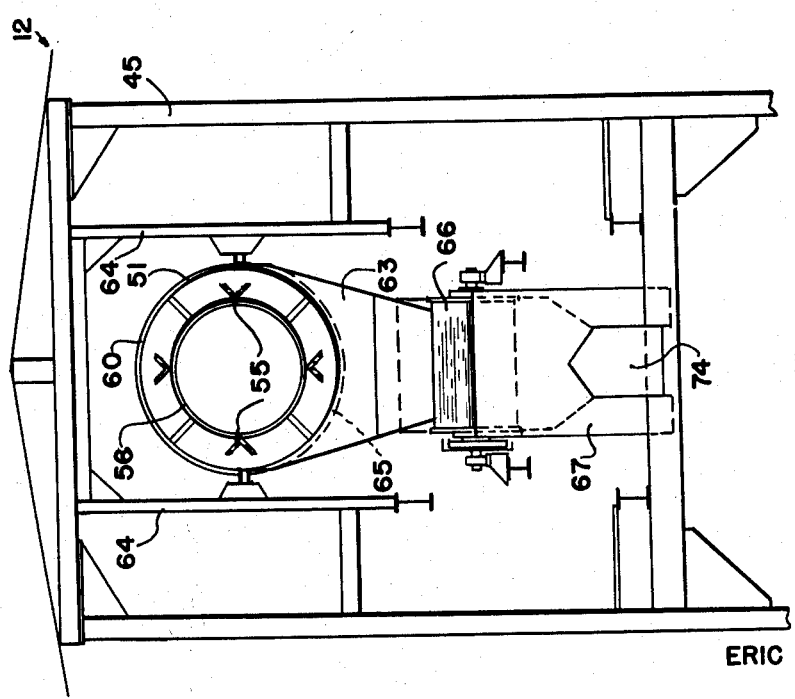
FIGURE 3 is a sectional view taken along the line III—III of FIGURE 1.

As stated initially above, a considerable amount of smaller reusable metallics drop through the apertures in the tumbler barrel mentioned along with the crushed and reduced waste material. The smaller metallic particles are at least partially freed from the encrusting materials due to the tumbling and agitation experienced in this continuous flow rotatable tumbler barrel and they represent a high enough percentage of the total bulk of the tumbled mixture of smaller pieces and particles to warrant further reclamation operations. However, any further recovery operations must be very efficient and must process large tonnages of the tumbled mixture if the same are to be economically feasible. The smaller metallics, usually called "fines," may be employed in charging iron making furnaces, such as blast furnaces, after the same have been separated from the waste material.

The smaller metallics and the crushed encrusting material which fall through the apertures in the tumbler barrel are collected and delivered to an upwardly inclined conveyor 44 leading to the charging end of the continuous flow rotatable double screened classifier and cleaner 12. The classifier and cleaner 12 is supported by a suitable framework 45 a considerable distance above the ground and directly over a plurality of storage bins 46–49. The framework 45 carries a plurality of spaced rollers 50 which rotatably support an elongated and inclined double screened barrel 51. The barrel 51 is rotated about its axis by a variable speed motor 52 acting through suitable drive connections, not particularly shown.

The double screened barrel 51 comprises a pair of longitudinally spaced end assemblies 53 and 54 which are interconnected and spanned by a plurality of longitudinally extending and circumferentially spaced angle-shaped supporting members 55. Attached to the inner edges of the supporting members 55 is an elongated and generally cylindrical inner screen 56 having openings 57 therein. The inner screen 56 may comprise a casting of light weight and wear resistant material, such as manganese, for example. Encircling the inner screen 56 in spaced relation thereto is an elongated and generally cylindrical outer screen 60 having openings 61 therein. It will thus be seen that the inner and outer screens are concentrically mounted and are adapted to be rotated upon energization of the motor 52 to tumble and agitate the material therein. The axis of the double screened barrel 51 is inclined slightly with respect to the horizontal whereby the material (comprising the smaller metallics and the crushed encrusting material) is fed through the double screened barrel. For reasons to be hereinafter more fully explained, the openings 57 in the inner screen 56 are smaller than the apertures in the sides of the continuous flow tumbler barrel but are larger than the openings 61 in the outer screen.

Positioned at the downstream end of the concentric and generally cylindrical inner and outer screens is a downwardly directed chute 63 which is stationarily supported by vertical members 64 from the framework 45. The chute 63 has an inturned semicircular lip portion 65 which is received in overlying relation with respect to the interior end surface of the outer screen 60. The arrangement is such that the smaller metallics and crushed encrusting material remaining within the interior of the inner screen 56 and entrapped between the inner and outer screens will be discharged into the chute 63.

Positioned directly beneath the lower end of the chute 63 is a magnetic separating drum 66 and a pair of chutes 67 and 74 are supported in proper relation beneath the magnetic drum 66. In this manner the smaller metallics and crushed encrusting material suspended between the inner and outer screens and retained within the interior of the inner screen will be collected and directed by the chute 63 over the magnetic separating drum 66 to separate the reusable smaller metallics from the waste material. The waste material will be directed by the chute 74 to the storage bin 48 while the reusable smaller metallics which cling to the periphery of the magnetic separating drum will be directed by chute 67 into the storage bin 49. The magnetic separating drum 66 is, of course, adapted to be rotated and the motor 68 is provided for this purpose.

The smaller metallics and crushed encrusting material passing through the openings in both the inner and outer screens are directed onto a horizontal conveyor 69 positioned directly below the double screened barrel 51 by means of angularly related and longitudinally extending guide plates 70. The conveyor 69 is operative to move this material toward the charging end of the double screened barrel and the end of the conveyor 69 is a magnetic separating drum 71 which, in combination with a V-shaped divider 72, is adapted to separate the smaller reusable metallics from the waste material. The magnetic separating drum 71 is driven by motor 73 and the smaller reusable metallics are directed to storage bin 46 while the waster material falls into the storage bin 47.

Each of the storage bins 46-49 is provided with a discharge gate, not particularly shown, at the bottom thereof and a conveyor 74' extends beneath the discharge chutes of these bins. The bins can be emptied individually or in multiples to deliver the reusable smaller metallics to suitable storage areas or directly into mobile hauling equipment or to deliver the waste material to suitable dumps or for further processing as is most desirable and expedient in a given installation.

The rotatable classifier and cleaner 12 separates the supplied metallics and crushed encrusting material into a plurality of distinct size classifications—that portion passing through the openings in both the inner and outer screens, that portion passing through the openings in the inner screen but entrapped between the inner and outer screens and that portion which is retained within the interior of the inner screen. In addition, the assembly 12 operates to further tumble and clean this material. The portion of the smaller metallics and crushed encrusting material which passes through the openings in both of the screens is collected and conveyed to the magnetic separating drum 71 where the reusable smaller metallics are separated from the waste material. The remainder of the smaller metallics and the crushed encrusting material—including those portions entrapped between the inner and outer screens and within the interior of the inner screen— is carried through and out the end of the double screened barrel into the chute 63 and are directed over the periphery of the magnetic separating drum 66. The reusable smaller metallics or fines are directed to storage bin 49 while the waste material is collected in storage bin 48.

The two size classifications of the smaller metallics and crushed encrusting material emitted from the classifier via chute 63 and conveyor 69 are passed over individual and separate magnetic separating drums to obtain maximum separation of the reusable cleaned smaller metallics from the waste material. Each of the magnetic separating drums and the divider or chutes associated therewith can be designed and operated to afford maximum separation of the smaller metallics from the waste material for the size of the particles being worked. For example, it will be understood that the relative weight of any particle varies directly with its size and that the magnitude of magnetic retraction required to hold the magnetic particles to the periphery of a magnetic separating drum and the optimum position of the divider or chutes with respect to the magnetic separating drum will vary for different sizes of particles being processed. Thus, each of the magnetic separating drums and its associated divider or chutes are designed and operated to reclaim the maximum amount and crushed encrusting material delivered to the continuous flow rotatable classifier 12 will normally have a particle size of less than three inches. The openings in the inner screen 56 may be one and one-half inches in diameter so that the smaller metallics and encrusting material having a particle size from one and a half inches to three inches will be retained within the inner screen 56. The still smaller metallics and crushed encrusting material will pass onto the outer screen 60 which preferably has a one-half inch square mesh. Smaller metallics and encrusting material having a particle size of less than one-half inch will pass through the openings in both of the screens and onto the conveyor 69 while the smaller metallics and encrusting material having a particle size from one-half of an inch to one and one-half inches will be entrapped between the inner and outer screens. Thus, the cleaned reusable metallic in the storage bins 46 will have a particle size of less than one-half of an inch while the smaller metallics in storage bin 49 will range in size from one-half of an inch to three inches.

It should now be apparent that I have accomplished the objects initially set forth by providing a highly improved rotatable double screened classifier and cleaner for recovering reusable metallics from steel making slag and refuse. Of particular importance is that large tonnages of bulk slag and refuse are processed in a continuous and automatic manner with a minimum of effort and in a minimum of time. The smaller metallics and crushed encrusting material are separated into a plurality of distinct size classifications while simultaneously being subjected to further tumbling and churning to further clean the smaller metallics. The sized discharges emitted by the rotatable classifier are each passed over individual magnetic separating drums. The above provide for the maximum recovery and reclamation of the reusable smaller metallics from the waste material.

It should also be readily apparent that many changes may be made in the disclosed embodiment of the invention without departing from the clear teachings thereof. For example, it may be desirable to provide another magnetic separating drum and direct the material retained in the interior of the inner screen over this additional magnetic separating drum by the use of suitable conveying means rather than combining this material with the material entrapped between the inner and outer screens.

Accordingly, reference should be had to the following appended claims in determining the true scope and intent of this invention.

I claim:

1. Apparatus for reclaiming metal bearing particles from granulous waste material containing metal particles and slag wherein the metal particles are commonly encrusted with slag comprising a pair of spaced parallel supporting rings interconnected by a plurality of longitudinally extending but circumferentially spaced struts, means to rotatably support said rings, an inner cylindrical screen received within said struts and supported thereby, means to charge said granulous waste material into one end of said inner screen, the arrangement being such that the static and impact loads caused by said charging are absorbed by said struts and rings, an outer cylindrical screen of finer mesh than said inner screen positioned concentrically about said struts and rotatable therewith, means to rotate said rings and consequently said struts and screens, means positioned below said outer screen and longitudinally coextensive therewith to collect the discharge therefrom, means to collect the discharge of the annular space between said screens, and means to magnetically separate said discharges, the arrangement being such that said struts tumble the waste material passing outwardly through said inner screen to clean the encrusting slag from the metal particles thereof.

2. Apparatus according to claim 1 further characterized in that said means to collect the discharge from said outer screen comprises a conveyor belt positioned below said outer screen and extending longitudinally throughout the length of the screen, and longitudinally extending guide plates flaring upwardly and outwardly from the side edges of said belt to close proximity with said outer screen and on opposite sides thereof.

References Cited in the file of this patent

UNITED STATES PATENTS

| | | |
|---|---|---|
| 1,284,872 | Bryan | Nov. 12, 1918 |
| 1,585,242 | Hageman | May 18, 1926 |
| 1,596,428 | Greene | Aug. 17, 1926 |
| 2,721,035 | Lankford | Oct. 18, 1955 |